Dec. 29, 1942.    C. H. O. WITTIG    2,306,853
OPTICAL INSTRUMENT
Filed June 21, 1941

CARL H.O. WITTIG
INVENTOR

BY *J.A. Ellestad*
ATTORNEY

Patented Dec. 29, 1942

2,306,853

UNITED STATES PATENT OFFICE 2,306,853

OPTICAL INSTRUMENT

Carl H. O. Wittig, Irondequoit, N. Y., assignor to Bausch & Lomb Optical Company, Rochester, N. Y., a corporation of New York Application June 21, 1941, Serial No. 399,141

2 Claims. (Cl. 88—33)

This invention relates to optical instruments and more particularly it has reference to instruments embodying prisms such as binoculars or microscopes, for example.

The chief object of my invention is to provide improved means for mounting prisms in optical instruments which will be relatively simple in structure yet efficient in operation. Other objects are to provide means for holding prisms on mounts which will eliminate strain on the prisms and to provide holding means which will permit adjustment of the prisms to secure optical alignment. These and other objects and advantages reside in certain novel features of construction, arrangement and combination of parts as will hereinafter be more fully explained and pointed out in the appended claims.

Referring to the drawing.

Figure 1:
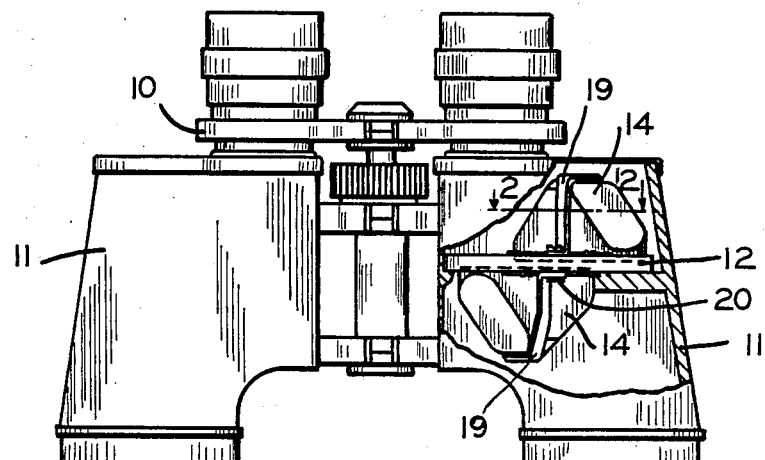
Fig. 1 is a view of a binocular with parts broken away to show my improved prism mounting.
Figure 2:
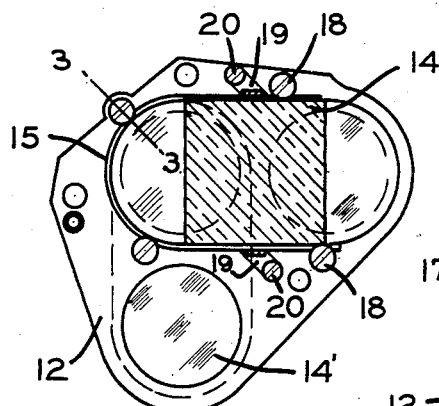
Fig. 2 is an enlarged view taken on line 2—2 of Fig. 1.
Figure 3:
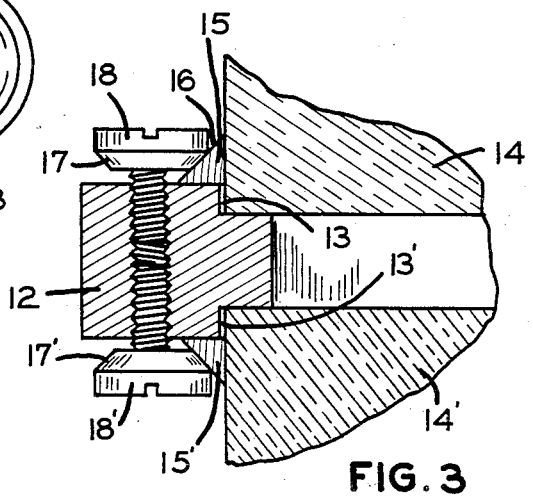
Fig. 3 is an enlarged view taken on line 3—3 of Fig. 2.

A preferred embodiment of my invention is disclosed in the drawings wherein 10 indicates a prism binocular of a usual type having the body 11 in which is mounted an apertured table 12 having on its respective faces the recessed seats 13 and 13' in which are mounted the Porro prisms 14 and 14'. Extending around one end and along two sides of prism 14 is the abutment member 15 which is preferably triangular in cross-section and has an inclined face 16 against which bears the tapered face 17 of screw 18 threaded into table 12. As the screw 18 is advanced into the table, it will be apparent that the tapered face 17 will act like a cam and force the member 15 against the side of the prism 14. Prism 14' is similarly mounted by means of member 15' and the screw 18' having the tapered face 17'.

In assembling the prisms 14 and 14' on the table 12, one of the prisms, 14 for example, is positioned firmly on its seat in the table by means of the abutment member 15 and screws 18. The other prism is then placed in its seat with one end of the prism forced against the wall of its seat by means of the screws at the opposite end of the prism. The two screws at the respective sides of the prism are then adjusted so as to move the prism into proper angular relation to the first prism. This operation can, therefore, be effected readily and accurately and without placing the prisms under strain. The abutment members 15 and 15' may be formed of aluminum, soft copper or any other suitable material. Instead of being triangular in cross-section, the members 15 and 15' may be circular or of any other suitable shape. After the prisms have been aligned, additional holding means, such as straps 19, may be placed over the tops of the prisms and held in position by screws 20.

From the foregoing, it will be apparent that I am able to attain the objects of my invention and provide simple, yet efficient, means for holding prisms in optical instruments. The abutment member is preferably formed in a single strip so as to extend along the two sides and around one end of the prism because this facilitates handling, but it could also be cut into several pieces so as to provide several spaced members each of which would be engaged by a screw with a tapered portion. Various other modifications can obviously be made without departing from the spirit of my invention.

I claim:

1. In an optical instrument, the combination of a table having a prism seat, a prism mounted on said seat, means for adjustably holding the prism on said seat comprising a member having a substantially triangular cross-section, one face of said member being horizontal and in engagement with the table and another face being vertical and in engagement with a side of the prism, and a screw threaded into the table and having a tapered portion engaging the other face of said member which is inclined to the vertical.

2. In an optical instrument, the combination of a table having a prism seat, a prism mounted on said seat, means for adjustably holding the prism on said seat comprising a member which engages opposite sides of the prism and has an inclined outer face, and screws threaded into the table adjacent the member, each screw having a tapered head portion engaging the inclined face of the member whereby a camming action may be exerted on the member to adjustably position the prism.

CARL H. O. WITTIG.